United States Patent [19]

Hashimoto et al.

[11] Patent Number: 5,106,790
[45] Date of Patent: Apr. 21, 1992

[54] FILLER MATERIALS FOR SPIRAL GASKETS

[75] Inventors: Akira Hashimoto, Sanda; Masahiko Takaoka, Kobe; Takeshi Miyoshi, Sanda, all of Japan

[73] Assignee: Nippon Pillar Packing Co. Ltd., Osaka, Japan

[21] Appl. No.: 749,400

[22] Filed: Aug. 26, 1991

[51] Int. Cl.$^5$ ............................................. C04B 35/80
[52] U.S. Cl. ....................................... 501/95; 501/108; 501/123
[58] Field of Search ........................ 501/95, 108, 123; 106/711

[56] References Cited

U.S. PATENT DOCUMENTS 4,810,677 3/1989 Heinze et al. ..................... 501/95
5,053,175 10/1991 Berchall et al. ................... 501/95

Primary Examiner—Mark L. Bell
Assistant Examiner—Deborah Jones
Attorney, Agent, or Firm—Griffin Branigan & Butler

[57] ABSTRACT

A filler material for spiral gaskets has: 36.5 weight percent or more fibrous material, composed of 5 to 20 weight percent ceramic fibers, 13.5 to 25 weight percent sepiolite and 1 to 10 weight percent organic fibers; 59 weight percent or less inorganic powder; and 1 to 10 weight percent organic polymeric binder. The filler material of the present invention may be used as a substitute for conventional asbestos filler material in spiral gaskets and is superior to asbestos filler material in heat resistance.

5 Claims, 1 Drawing Sheet

FILLER MATERIALS FOR SPIRAL GASKETS

FIELD OF THE INVENTION

The present invention relates to filler materials for spiral gaskets, and more particularly to filler materials to be used in spiral gaskets for sealing conduits of high temperature fluid, such as automobile exhaust pipes.

PRIOR ART

As shown in FIG. 1, a spiral gasket is produced by rolling two or more times a belt-shaped metal hoop material 1, having a filler material 21 therein, in a spiral configuration, such as the cross-section shown in FIG. 1. Such gaskets are generally used for sealing spaces between pipe connection flanges in conduits for high temperature fluids, e.g. automobile exhaust gases.

The prior art filler material is generally made of inorganic paper made from inorganic fibers by a conventional paper-making process, and asbestos fibers have been the traditional fibrous filler material used in spiral gaskets employed in high temperature conditions, e.g. in automobile exhaust conduits.

Recently, however, the use of asbestos is restricted or prohibited, in view of the adverse affects on human health and prevention of pollution. Asbestos is likely to produce significant amounts of dust in its handling, and it is said to lead to lung cancer, or asbestosis or mesothelioma due to deposit of asbestos particles in the lungs or on the skin. Further, asbestos is a pollutant, and restrictions on its use are becoming more strict each year, from the view point of global environmental protection.

There is, hence, a need in the art for the development of asbestos-free filler material. In this regard, filler material using glass fibers, instead of asbestos, has been proposed in the art. Glass fibers, however, cannot be used at temperature of 600° C. or higher because the glass fibers melt, and, hence, shrink. Thus, for example, glass fibers cannot be used as the filler material with high temperature fluids, such as automobile exhaust.

Further, in regard to other proposals in the art, nothing superior to or even equal to conventional asbestos filler material has been proposed, especially in regard to high temperature heat resistance.

SUMMARY OF THE INVENTION

It is, therefore, a primary object of the invention to provide a filler material for use with spiral gaskets that is not only usable as a substitute for asbestos filler material, but that has high temperature heat resistance superior to that of conventional asbestos filler material.

The above object is achieved by a filler material which comprises about 36.5 weight percent or more of fibrous material. The fibrous material is composed of about 5 to 20 weight percent of ceramic fibers, about 13.5 to 25 weight percent of the mineral sepiolite (also called meerschaum) and about 1 to 10 weight percent of organic fibers. In addition, the filler material has 59 weight percent or less inorganic powder, and 1 to 10 weight percent of a polymeric organic binder. This filler material is asbestos-free, and a spiral gasket with this filler material is capable of exhibiting high temperature heat resistance at least equal to conventional asbestos filler material and exhibits even better sealing capacity than gaskets made with conventional asbestos filler material.

The fibrous material provides the filler material with the shape-return capability and strength required for such gaskets, when the amount thereof is at least about 36.5 weight percent. Below this amount, sufficient shape-return capability and strength cannot be guaranteed. Therefore, the amount of the fibrous material contained in the filler material is about 36.5 weight percent or higher. However, in order that the porosity of the filler material (induced by the fibrous material) is not too high, that is, in order that sealing performance may not be sacrificed, that amount, preferably, is 50 weight percent or less.

This fibrous material is composed of combinations of a ceramic fiber, sepiolite and an organic fiber. The ceramic fiber should have a fiber diameter of about 1 to 5 $\mu$m and a length of about 0.1 to 5 mm, e.g. about 1.3 mm, so as to form a mesh-like structure within the filler material. Ceramic fibers have excellent high temperature heat resistance and provide the filler material with stable strength at standard room temperature or in highly heated condition. However, when ceramic fibers are vigorously rubbed against each other or compressed, the fibers tend to abrade and break. A good balance between high heat resistance and degradation due to abrasion and breaking is when the amount of ceramic fiber in the filler is between about 5 to 20 weight percent. Preferred ceramic fibers are aluminosilicate fibers, e.g. with a composition of about 48% $Al_2O_3$ and 52% $SiO_2$.

The preferred sepiolites (complex hydrous magnesium silicates) are those of the $\alpha$-type, with fiber diameters of about 0.1 to 0.3 $\mu$m, especially about 0.2 $\mu$m and lengths of about 3 to 5 $\mu$m. Sepiolite forms a fine mesh-like structure in the filler material. At standard room temperature, sepiolite possesses a fiber interlocking property which improves the integrity of the filler material and helps to hold it together. When heated, it exhibits a sintering property, e.g. fires like a clay, and functions as a permanent binder with high heat resistance. However, these functions are not sufficiently exhibited if the amount of sepiolite is less than about 13.5 weight percent. Unlike ceramic fibers, sepiolite is not broken by abrasion, and this improves the overall strength of the filler material during use. On the other hand, when the amount exceeds about 25 weight percent, the filler material becomes more hard than desired and, hence, the sealing performance of the filler material is lowered. Accordingly, the amount of sepiolite should be somewhere between about 13.5 and 25 weight percent.

The preferred organic fiber is hemp pulp or the like. The organic fiber forms a mesh-like structure within the filler material at standard room temperature and provides the necessary bending and tensile strength for producing the filler material by conventional paper-making processes and manipulating it during the manufacture of the gaskets. However, this strength is not sufficient when the amount of the organic fiber in the filler material is less than about 1 weight percent. On the other hand, if the amount of organic fiber exceeds about 10 weight percent, the heat resistance of the filler material and the gasket is lessened. Accordingly, the amount of organic fiber is between about 1 and 10 weight percent. The fibers of hemp pulp are about 1 to 6 $\mu$m thick and about 20 $\mu$m wide. Since these fibers have somewhat random sizes, the foregoing is merely characterizing dimensions, and, for example, the fibers can have lengths of up to 20 $\mu$m.

The preferred inorganic powders are mineral talc, calcium carbonate, clay, barium sulfate or the like. Generally, the powders have a granule diameter of about 1 to 50 μm, preferably about 8 to 20 μm, a bulk specific gravity between about 0.9 and 1.3 g/cc and an absolute specific gravity of about 2.8 g/cc. The powders are relatively soft. For example, talc has a Mohs hardness of about 1. The inorganic powder is blended in the filler material in order to increase the density and enhance the sealing performance of the gasket. For example, mineral talc is a flexible mineral in a thin flake form (stratiform sheets in shape) and will densely fill the mesh-like structure provided by the fibrous material, which enhances the sealing performance. The amount of the inorganic powder in the filler material should be 59 weight percent or less, but preferably at least about 45.5 weight percent.

The preferred binder is natural or synthetic rubber latex, resin emulsions or the like. About 1 to 10 weight percent binder is contained in the filler material in order to provide the necessary binding function, especially during manufacture and forming in a gasket. A preferred binder is NBR (acrylonitrile/butadiene rubber).

DESCRIPTION OF A PREFERRED EMBODIMENT

Figure 1:
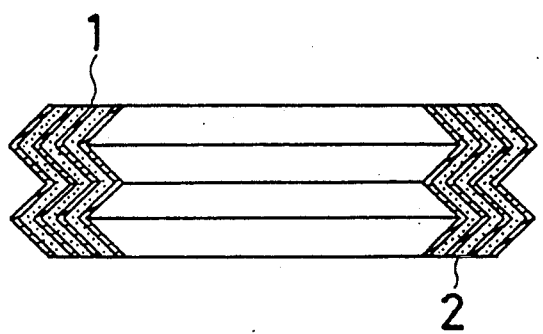
FIG. 1 is a sectional view of a typical spiral gasket.

As an embodiment, a filler material I of the composition shown in Table 1, with alumino-silicate ceramic fibers, was prepared by the conventional paper-making process for making such filler materials, i.e. slurrying the ingredients, depositing on a wire screen, dewatering and drying, all of which is conventional, and the details need not be set forth herein, as they are well known in the art. As reference examples, a filler material II of the composition shown in Table 2 and a filler material III of the composition as shown in Table 3 were also prepared by the same paper-making process. The filler material II is the same as the composition of filler material I, except that glass fibers were used instead of the alumino-silicate ceramic fibers, and filler material III is a traditional asbestos filler material. The bulk density was 1.0 g/cm³ for the filler materials I, II, and 0.82 g/cm³ for the filler material III. Spiral gaskets with inside diameter of 43.5 mm, outside diameter of 57 mm, and thickness of 5.0 mm (see FIG. 1) were manufactured with each of the filler materials, and the sealing performance and impact resistance were tested for each gasket.

In the sealing performance test, the gasket was compressed to a thickness of 4 mm, and in this stage nitrogen gas at 0.5 kg/cm² was injected into the inner circumference of the gasket. The nitrogen gas which leaked out to the outer circumference of the gasket was measured. The amount of the leakage of the nitrogen gas was measured by way of measuring the moving speed of a soap film in a measuring cylinder after introducing the leaked nitrogen gas into that measuring cylinder.

In the impact resistance test, a bob of 200 g was dropped onto the gasket from a height of 500 mm so as to apply the impact to the gasket in the thicknesswise direction (in the axial direction). The dropping of the bob was repeated 50 times. The loss due to chipping off of the filler material (that is, loosening and coming off of the filler material due to the impact of the bob) was measured, thereby evaluating the impact resistance strength of the filler material. Needless to say, the smaller the weight loss of the filler due to impact, the greater the impact resistance.

These performance tests were conducted at standard room temperature and after heating the filler materials (the gaskets) to 400° C., 600° C., and 800° C., respectively, for three hours. The results are shown in Table 4 and Table 5.

As can be seen from Table 4, the sealing performance of the gaskets using filler materials II (glass fibers) and III (asbestos) is markedly lower after heated at 800° C. This is because the glass fibers in the filler material II melt and contract, and the asbestos in the filler III releases some of its crystalline water when heated at 800° C. By contrast, the sealing performance of the gasket using filler material I (the ceramic fibers) does not substantially deteriorate even at the high temperature condition of 800° C. Thus, essentially the same sealing function provided at 600° C. (a lower temperature) may also be substantially provided at 800° C.

Also, as shown in Table 5 regarding impact resistance, the weight loss of the filler material II, using glass fibers, is markedly great at 800° C. due to the chipping off of the filler material. This indicates that the impact resistance of the filler material II is extremely weakened in high temperature conditions. On the other hand, while the filler material I (ceramic fibers) is inferior to the filler material III (asbestos) at 600° C. or lower, after heating to 800° C., the weight loss of the filler material I due to the chipping off is smaller than that of the filler material III (asbestos). This indicates that the impact resistance strength of the filler material I is superior to asbestos filler material III at 800° C.

TABLE 1

| Composition of Filler Material I (the invention) | | |
|---|---|---|
| Fibrous Material | Ceramic fiber | 12 wt. % |
|  | α-type sepiolite | 20 wt. % |
|  | Hemp pulp (organic fiber) | 7 wt. % |
| Inorganic Powder | Talc mineral | 56 wt. % |
| Binder | NBR latex | 5 wt. % |

TABLE 2

| Composition of Filler Material II (reference) | | |
|---|---|---|
| Fibrous Material | Glass fiber | 12 wt. % |
|  | α-type sepiolite | 20 wt. % |
|  | Hemp pulp | 7 wt. % |
| Inorganic powder | Talc mineral | 56 wt. % |
| Binder | NBR latex | 5 wt. % |

TABLE 3

| Composition of Filler Material III (reference) | | |
|---|---|---|
| Fibrous Material | Asbestos | 96.5 wt. % |
| Binder | NBR latex | 3.5 wt. % |

TABLE 4

|  |  | Filler Material | | |
|---|---|---|---|---|
|  |  | I | II | III |
| Sealing performance (cc/min) | Standard temperature | 3.1 | 2.1 | 7.2 |
|  | 400° C. (after 3-hour heating) | 2.0 | 2.1 | 8.2 |
|  | 600° C. (after 3-hour heating) | 3.0 | 3.8 | 5.4 |
|  | 800° C. (after 3-hour heating) | 5.6 | 17.3 | 23.0 |

TABLE 5

| | | Filler Material | | |
|---|---|---|---|---|
| | | I | II | III |
| Impact resistance (mg) | Standard temperature | 1 | 1 | 1 |
| | 400° C. (after 3-hour heating) | 158 | 147 | 1 |
| | 600° C. (after 3-hour heating) | 229 | 308 | 14 |
| | 800° C. (after 3-hour heating) | 330 | 848 | 384 |

From the above results, it can be seen that the present invention allows replacement of undesired asbestos filler material in spiral gaskets with, not only, equally functional ceramic fiber filler material, but with improved properties. The data also shows that an art-proposed substitute for asbestos, i.e. glass fibers, is clearly inferior to asbestos and to the present ceramic fibers, even when the glass fibers are compounded into the present improved structure, i.e. with sepiolite, organic fiber, mineral talc, etc., as shown in Tables 1 to 2 in connection with a preferred embodiment.

However, the invention is not limited to the preferred embodiments and a wide range of ceramic fibers, organic fibers, inorganic powders and binders may be used. For example, the ceramic fibers may be mineral wool, zirconia, titanate, silica, alumino-silicate chromia, alumina fibers and the like. The organic fibers may be a natural or synthetic fibers such as the natural fibers of cotton and wool or synthetic fibers such as olefins (polyethylene and polypropylene), acrylic, polyvinyl chloride or alcohol, acetate, nylon fibers and the like. The inorganic powders, in addition to those identified above as preferred embodiments, may be zeolites, cement, alpha-gypsums, plaster, oxides of titanium, magnesium, silica and aluminum, and the like. The binders may be usual polymeric organic binders, such as polyvinyl alcohol, polyvinyl chloride, acrylates, polyvinyl acetate, ethylene vinyl acetate, cellulose acetate and the like.

What is claimed is:

1. A filler material for a spiral gasket, comprising:
   (1) about 36.5 or more of fibrous material having (i) about 5 to 20% ceramic fibers, (ii) about 13.5 to 25% sepiolite, and (iii) about 1 to 10% organic fibers;
   (2) about 1 to 10% of a polymeric organic binder; and
   (3) about 59% of an inorganic powder.

2. The filler material of claim 1, wherein the organic fibers are hemp pulp.

3. The filler material of claim 1, wherein the inorganic powder is selected from talc, calcium carbonate, clay and barium sulfate.

4. The filler material of claim 1, wherein the ceramic fibers have a diameter between about 1 and 5 $\mu$m.

5. The filler material of claim 1, wherein the sepiolite is of the $\alpha$-type and has a diameter of about 0.2 $\mu$m.

* * * * *